US012645302B2

(12) United States Patent
Hwang et al.

(10) Patent No.:    US 12,645,302 B2
(45) Date of Patent:         Jun. 2, 2026

(54) ELECTRONIC APPARATUS FOR MATCHING HAND GESTURE TO INFORMATION REGARDING SETTING STATE AND CONTROLLING METHOD THEREOF

(71) Applicant: SAMSUNG ELECTRONICS CO., LTD., Suwon-si (KR)

(72) Inventors: Sungjun Hwang, Suwon-si (KR); Daewung Kim, Suwon-si (KR); Jiyeon Ma, Suwon-si (KR); Donghun Shin, Suwon-si (KR); Euijun Kim, Suwon-si (KR); Youngah Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 180 days.

(21) Appl. No.: 18/419,944

(22) Filed: Jan. 23, 2024

(65) Prior Publication Data

US 2024/0192781 A1      Jun. 13, 2024

Related U.S. Application Data

(63) Continuation of application No. PCT/KR2022/010772, filed on Jul. 22, 2022.

(30) Foreign Application Priority Data

Jul. 23, 2021      (KR) ........................ 10-2021-0097366

(51) Int. Cl.
   *G06F 3/01*                (2006.01)
(52) U.S. Cl.
   CPC .............. *G06F 3/017* (2013.01); *G06F 3/013* (2013.01)
(58) Field of Classification Search
   CPC .... G06F 3/1454; G06F 3/0481; G06F 3/0484; G06F 9/452; G06F 2203/04803;
   (Continued)

(56) References Cited

U.S. PATENT DOCUMENTS 8,843,858 B2    9/2014 Devi et al.
9,436,290 B2    9/2016 Kang et al.
(Continued)

FOREIGN PATENT DOCUMENTS

JP           2005-92419        4/2005
KR      10-2010-0000174        1/2010
(Continued)

OTHER PUBLICATIONS

International Search Report, PCT/ISA/210, dated Nov. 3, 2022, in PCT Application No. PCT/KR2022/010772.
(Continued)

*Primary Examiner* — Rinna Yi
(74) *Attorney, Agent, or Firm* — STAAS & HALSEY LLP

(57)                ABSTRACT

An electronic apparatus including a camera, a display, a communication interface configured to perform communication with an external device, a memory configured to store at least one instruction, and a processor, and the processor, by executing the at least one instruction, is configured to, based on a gesture of a user photographed through the camera being a capture gesture that is a predetermined gesture, obtain information regarding a setting state of at least one of the electronic apparatus or the external device, control the display to display a UI including information regarding the setting state, and based on a first gesture of the user using a specific object being input while the UI is displayed, match the first gesture with the obtained information regarding the setting state and store the first gesture matched with the obtained information regarding the setting state as a custom gesture.

11 Claims, 21 Drawing Sheets

(58) Field of Classification Search
CPC .. G06F 1/1605; G06F 3/04842; G06F 3/0487;
G06F 3/0482; G06F 9/451; G09G
2340/0492; G09G 2340/12; G09G 5/14;
H04N 21/4363; H04N 21/485
See application file for complete search history.

(56) References Cited

U.S. PATENT DOCUMENTS

| | | | |
|---|---|---|---|
| 9,965,039 | B2 | 5/2018 | Kwon |
| 10,802,704 | B2 | 10/2020 | Wang |
| 11,416,080 | B2 | 8/2022 | Heo et al. |
| 2011/0111798 | A1 | 5/2011 | Jeon et al. |
| 2012/0030566 | A1* | 2/2012 | Victor ................. G06F 3/04883 |
| | | | 715/702 |
| 2014/0062862 | A1 | 3/2014 | Yamashita |
| 2015/0177843 | A1* | 6/2015 | Kwon .............. H04N 21/42204 |
| | | | 715/863 |
| 2015/0193107 | A1* | 7/2015 | Schwesinger ........... G06F 3/017 |
| | | | 715/810 |
| 2015/0277573 | A1* | 10/2015 | Kang ...................... G06F 3/017 |
| | | | 345/156 |

FOREIGN PATENT DOCUMENTS

| | | |
|---|---|---|
| KR | 10-2014-0029223 | 3/2014 |
| KR | 10-2015-0073378 | 7/2015 |
| KR | 10-2015-0112708 | 10/2015 |
| KR | 10-2015-0134916 | 12/2015 |
| KR | 10-1652705 | 9/2016 |
| KR | 10-1665559 | 10/2016 |
| KR | 10-2033198 | 10/2019 |
| KR | 6598089 | 10/2019 |
| KR | 10-2020-0028771 | 3/2020 |

OTHER PUBLICATIONS

Written Opinion Report, PCT/ISA/237, dated Nov. 3, 2022, in PCT Application No. PCT/KR2022/010772.
Office Action dated May 29, 2025, in Korean Application No. 10-2021-0097366.

* cited by examiner

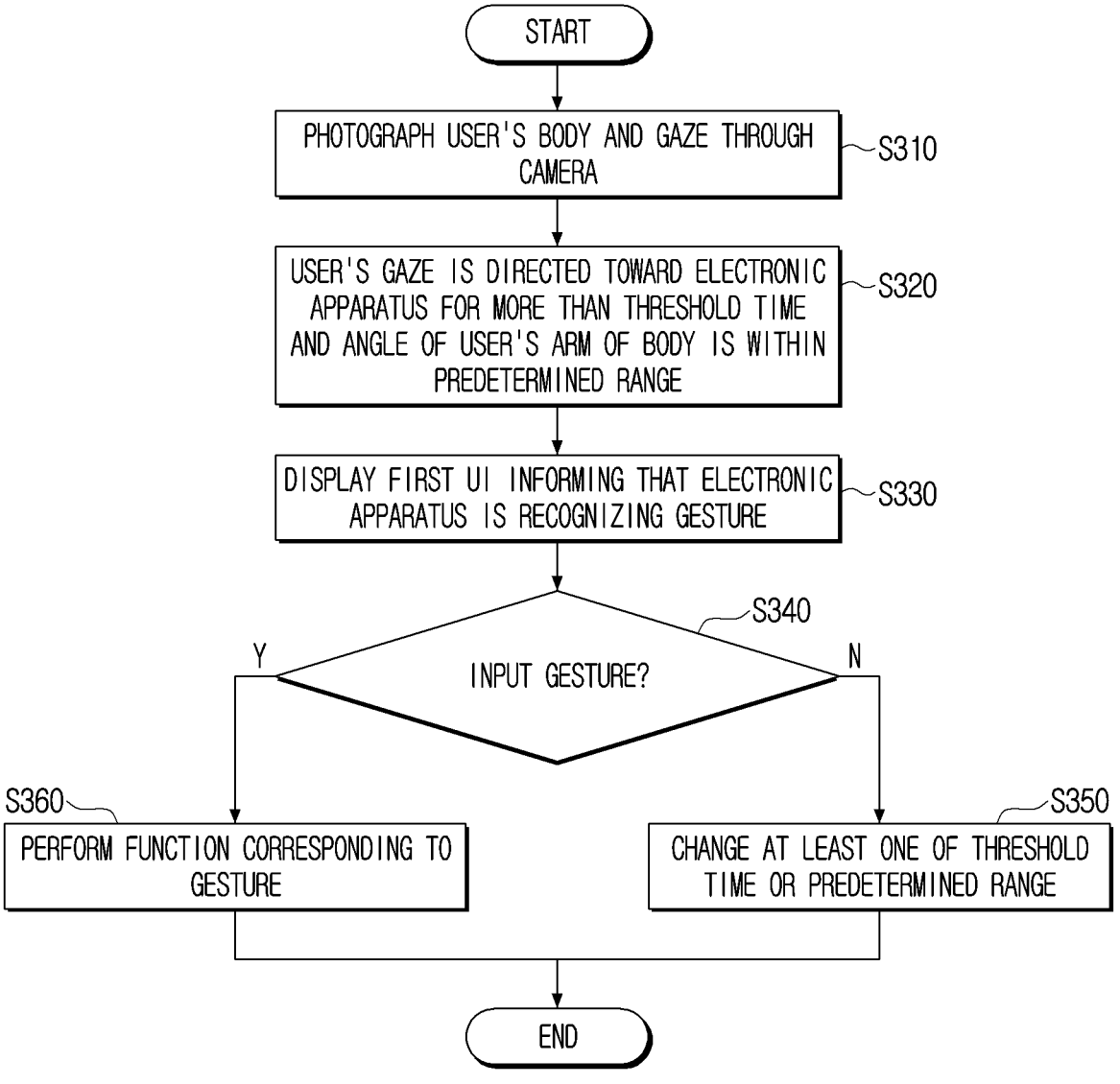

START

PHOTOGRAPH USER'S BODY AND GAZE THROUGH CAMERA ~S310

USER'S GAZE IS DIRECTED TOWARD ELECTRONIC APPARATUS FOR MORE THAN THRESHOLD TIME AND ANGLE OF USER'S ARM OF BODY IS WITHIN PREDETERMINED RANGE ~S320

DISPLAY FIRST UI INFORMING THAT ELECTRONIC APPARATUS IS RECOGNIZING GESTURE ~S330

S340

INPUT GESTURE?

Y  N

S360

PERFORM FUNCTION CORRESPONDING TO GESTURE

S350

CHANGE AT LEAST ONE OF THRESHOLD TIME OR PREDETERMINED RANGE

END

FIG. 6A
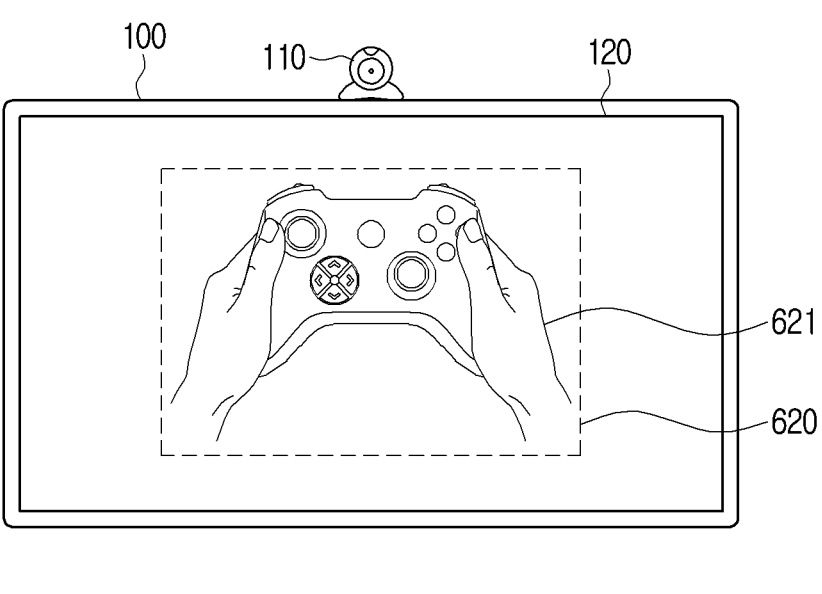

FIG. 6B
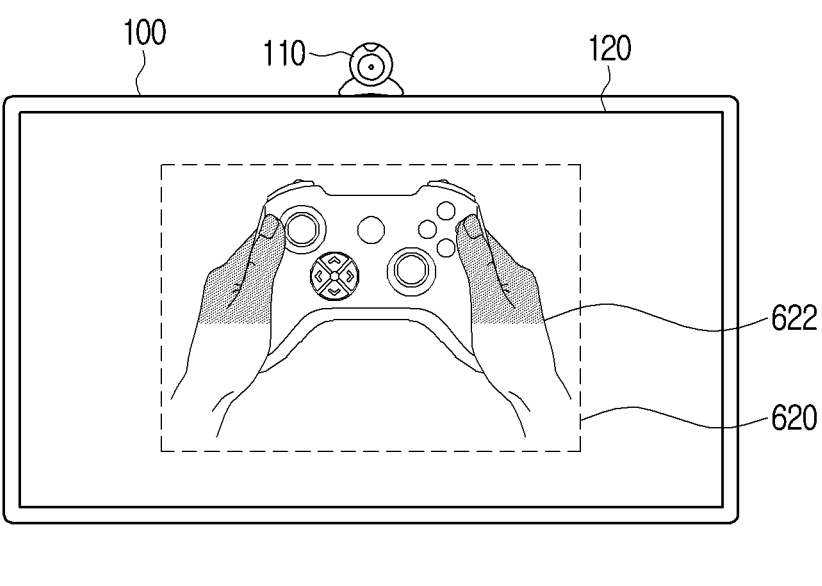

FIG. 6C
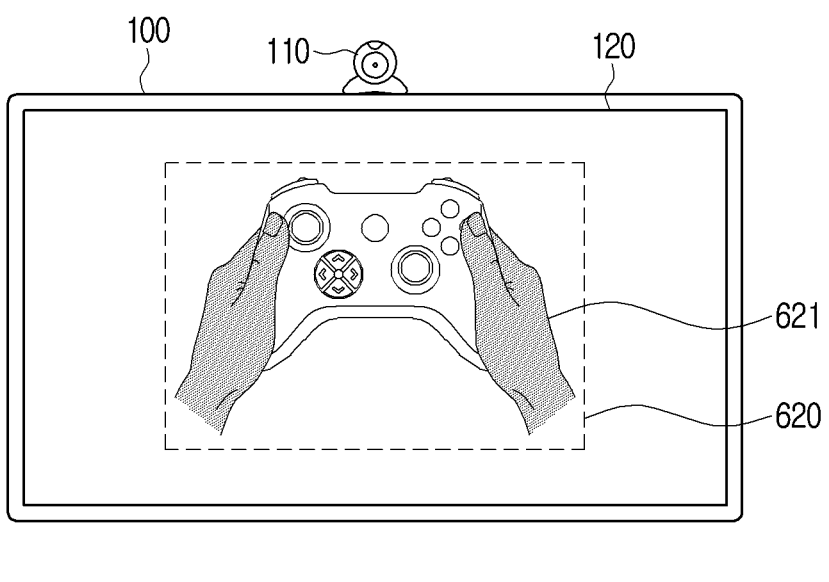

FIG. 6D
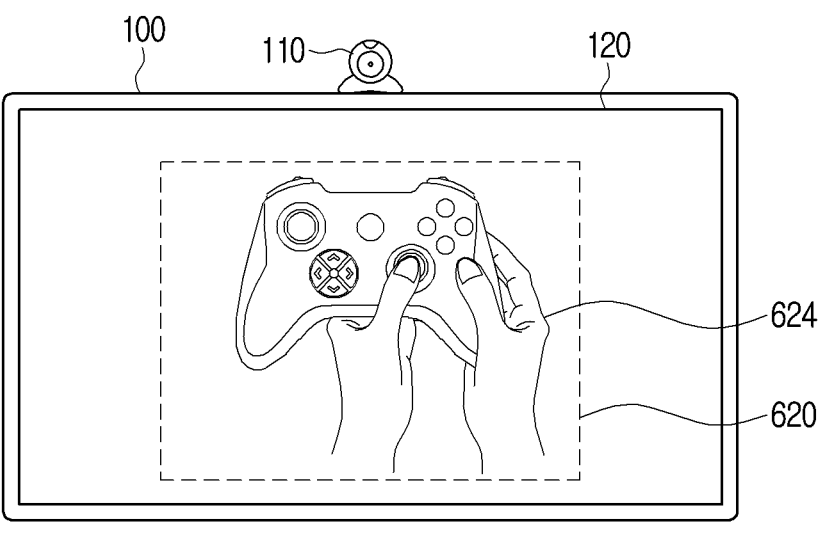
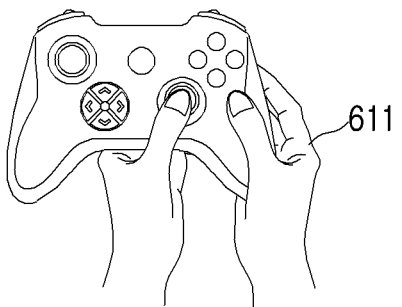

FIG. 7A
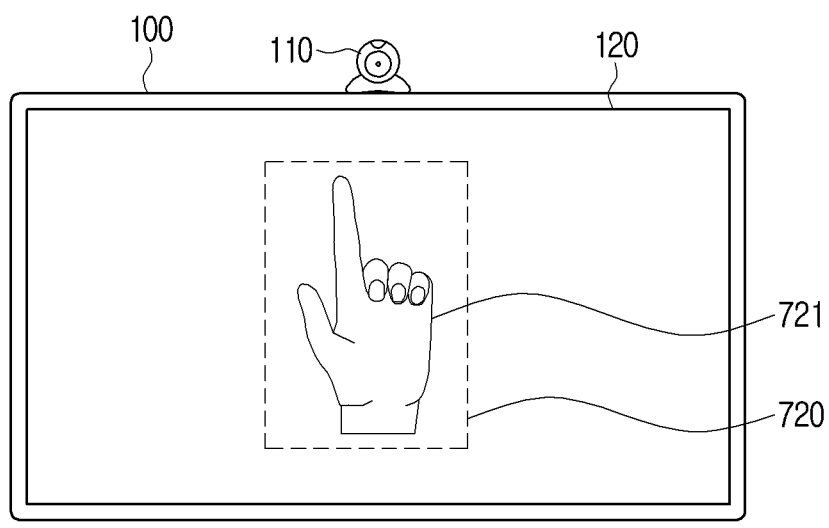
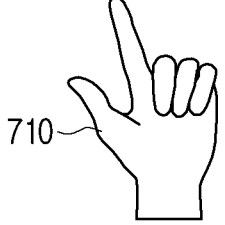

FIG. 7B
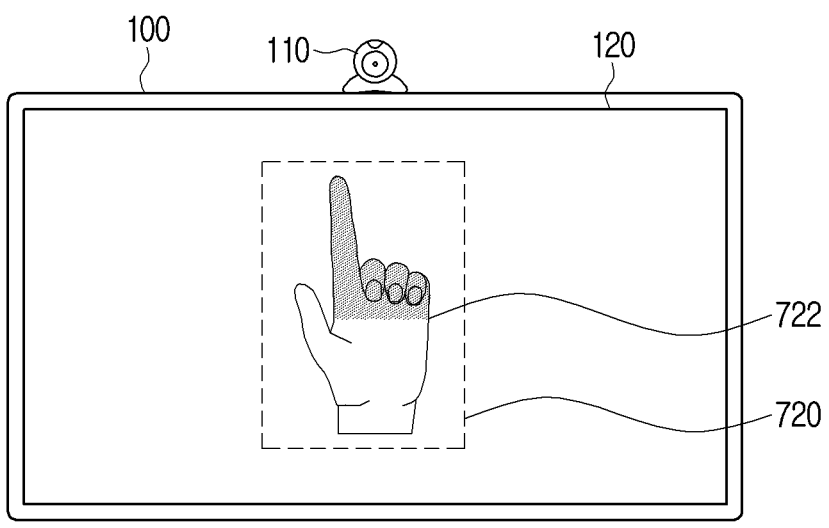
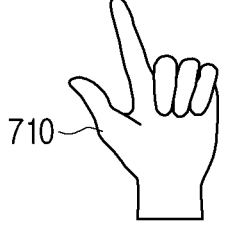

FIG. 7C
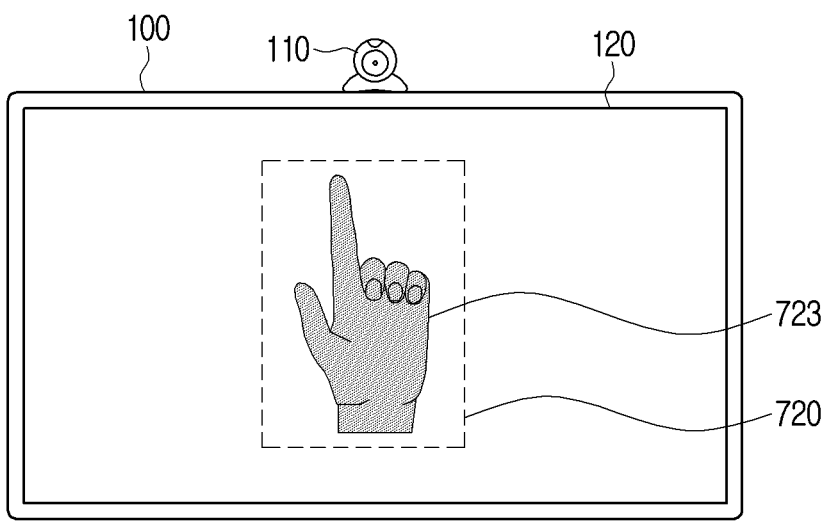
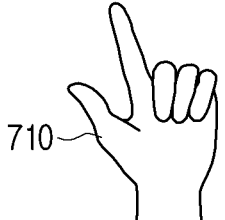

FIG. 7D
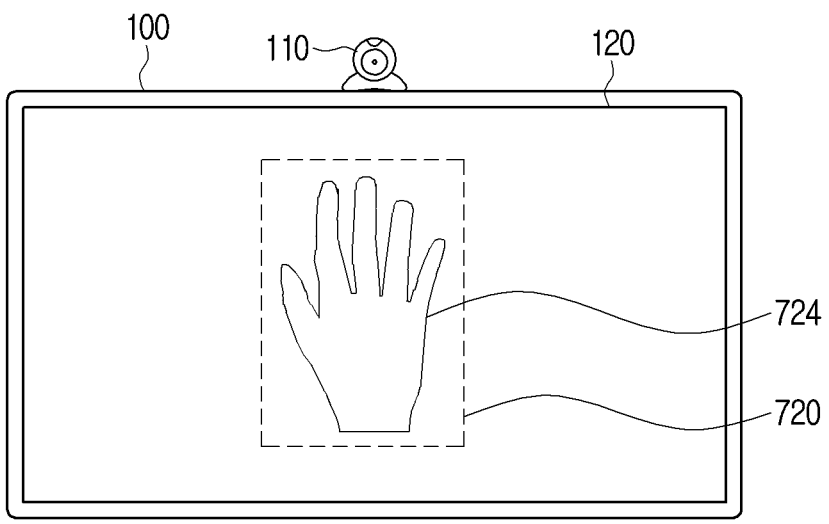
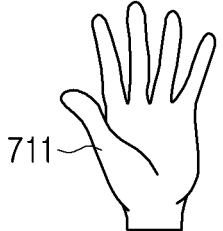

```
            ( START )
                |
                v
  RECOGNIZE CAPTURE GESTURE          ~S1010
                |
                v
  OBTAIN INFORMATION REGARDING SETTING STATE   ~S1020
                |
                v
  DISPLAY UI INCLUDING INFORMATION REGARDING
              SETTING STATE          ~S1030
                |
                v
  INPUT GESTURE USING SPECIFIC OBJECT WHILE UI
              IS DISPLAYED           ~S1040
                |
                v
  STORE INPUT GESTURE WITH OBTAINED INFORMATION
  REGARDING SETTING STATE AS CUSTOM GESTURE    ~S1050
                |
                v
             ( END )
```

ELECTRONIC APPARATUS FOR MATCHING HAND GESTURE TO INFORMATION REGARDING SETTING STATE AND CONTROLLING METHOD THEREOF

CROSS-REFERENCE TO RELATED APPLICATIONS

This is a continuation application of International Application No. PCT/KR2022/010772, filed Jul. 22, 2022, which is incorporated herein by reference in its entirety, it being further noted that foreign priority benefit is based upon Korean Patent Application No. 10-2021-0097366, filed Jul. 23, 2021, which is incorporated by reference herein in its entirety.

TECHNICAL FIELD

This disclosure relates to an electronic apparatus and a controlling method there of and more particularly, to an electronic apparatus that stores a custom gesture and changes the settings of the electronic apparatus and an external device and a controlling method thereof.

BACKGROUND ART

With the development of technology, there are various input methods for controlling an electronic apparatus, such as using a voice or a gesture, in addition to using a remote controller. In order to control the increasingly diverse functions and contents of an electronic apparatus such as a TV, the use of gestures and voices as well as the existing remote controller is increasing. The manipulation of such gestures is intuitive and convenient and provides availability and usability different from the existing manipulation. An electronic apparatus usually uses a camera to recognize user gestures. The electronic apparatus acquires a video image of the user's body using a camera attached to the electronic apparatus and recognizes the shape of the user's arms and hands to recognize the user's gestures.

Controlling an electronic apparatus using gestures has a problem in that the user needs to remember the type of gesture that he or she wans to use. Since most gestures are gestures predefined by the manufacture of the electronic apparatus, the user has the inconvenience of having to remember the predefined gestures. In addition, it is difficult to technically recognize the starting point of a gesture and thus, there is a separate gesture such as a wake-up gesture, which causes inconvenience to the user. Further, there is a problem in that the electronic apparatus recognizes a gesture even when the user does not intend to use the gesture, causing malfunctions.

DETAILED DESCRIPTION OF THE DISCLOSURE

Technical Task

The present disclosure provides an electronic apparatus capable of controlling the settings of the electronic apparatus and an external device connected to the electronic apparatus through a custom gesture defined by a user and a controlling method thereof.

Technical Solution

An electronic apparatus according to one or more embodiments comprises a camera, a display, a communication interface configured to perform communication with an external device, a memory configured to store at least one instruction, and a processor, and the processor, by executing the at least one instruction, is configured to, based on a gesture of a user photographed through the camera being a capture gesture that is a predetermined gesture, obtain information regarding a setting state of at least one of the electronic apparatus or the external device, control the display to display a UI including information regarding the setting state, and based on a first gesture of the user using a specific object being input while the UI is displayed, match the first gesture with the obtained information regarding the setting state and store the first gesture matched with the obtained information regarding the setting state as a custom gesture.

The processor, by executing the at least one instructions, may be configured to, based on a user's gesture photographed through the camera being the custom gesture, change setting states of the electronic apparatus and the external device based on the obtained information regarding the setting state with which the first gesture was matched.

The processor, by executing the at least one instructions, may be configured to control the display to display a UI for storing the custom gesture, based on the first gesture to be stored as the custom gesture being recognized while the UI for storing the custom gesture is displayed, control the display to display a first UI element for indicating an input degree of the first gesture until the first gesture is input, the first UI element including a first image that visually represents the first gesture, change the first UI element so that a shape of the first UI element is clarified according to an input degree of the first gesture while the first gesture is input, and based on the first gesture being changed to a second gesture while the first UI element is being changed, change the first UI element to a second UI element, the second UI element including a second image that visually represents the second gesture.

The processor, by executing the at least one instructions, may be configured to control the camera to photograph a user's body and gaze, and based on the gaze being directed toward the electronic apparatus for more than a threshold time and an angle of an arm of the user's body being within a predetermined range, control the display to display a UI indicating that the electronic apparatus is recognizing a gesture.

The processor, by executing the at least one instructions, may be configured to change the threshold time or the predetermined range based on whether the capture gesture or the custom gesture is recognized while the UI indicating that the electronic apparatus is recognizing a gesture is displayed.

The UI including information regarding the setting state may include a plurality of UI elements corresponding to each of the information regarding the setting state, and the processor, by executing the at least one instructions, may be configured to, based on an input for selecting at least one of the plurality of UI elements being sensed, match the first gesture with the information regarding the setting state corresponding to the selected UI element based on the input and store the first gesture matched with the information regarding the setting state corresponding to the selected UI element in the memory.

The processor, by executing the at least one instructions, may be configured to change a range of a UI element selected based on a direction in which the user's hands are pointing or a distance between the user's hands while the UI including the information regarding the setting state is displayed.

The specific object may include at least one of a game controller, a mouse, a remote controller, or a mobile phone, and the processor, by executing the at least one instructions, may be configured to change a setting state of the electronic apparatus and the external device based on information regarding a setting state corresponding to the specific object among the stored information regarding the setting state.

A controlling method of an electronic apparatus according to one or more embodiments includes, based on a gesture of a user photographed through a camera being a capture gesture that is a predetermined gesture, obtaining information regarding a setting state of at least one of the electronic apparatus or an external device that communicates with the electronic apparatus, controlling a display of the electronic apparatus to display a UI including information regarding the setting state, and based on a first gesture of a user using a specific object being input while the UI is displayed, matching the first gesture with the obtained information regarding the setting state and storing the first gesture matched with the obtained information regarding the setting state as a custom gesture.

The method may further include, based on a user's gesture photographed through the camera being the custom gesture, changing setting states of the electronic apparatus and the external device based on the information regarding the setting state with which the first gesture was matched.

The method may further include displaying a UI for storing the custom gesture, based on the first gesture to be stored as the custom gesture being recognized while the UI for storing the custom gesture is displayed, displaying a first UI element for indicating an input degree of the first gesture until the first gesture is input, the first UI element including a first image that visually represents the first gesture, changing the first UI element so that a shape of the first UI element is clarified according to an input degree of the first gesture while the first gesture is input, and based on the first gesture being changed to a second gesture while the first UI element is being changed, changing the first UI element to a second UI element, the second UI element including a second image that visually represents the second gesture. Meanwhile, the method may further include photographing a user's body and gaze and based on the gaze being directed toward the electronic apparatus for more than a threshold time and an angle of an arm of the body being within a predetermined range, displaying a UI indicating that the electronic apparatus is recognizing a gesture.

The method may further include changing the threshold time or the predetermined range based on whether the capture gesture or the custom gesture is recognized while the UI indicating that the electronic apparatus is recognizing a gesture is displayed.

The UI including information regarding the setting state may include a plurality of UI elements corresponding to each of the information regarding the setting state, and the method may further include, based on an input for selecting at least one of the plurality of UI elements being sensed, matching the first gesture with the information regarding the setting state corresponding to the selected UI element based on the input and storing the first gesture matched with the information regarding the setting state corresponding to the selected UI element.

The method may further include changing a range of a UI element selected based on a direction in which the user's hands are pointing or a distance between the user's hands while the UI including the information regarding the setting state is displayed.

The specific object may include at least one of a game controller, a mouse, a remote controller, or a mobile phone, and the method may further include changing a setting state of the electronic apparatus and the external device based on information regarding a setting state corresponding to the specific object among the stored information regarding the setting state.

In a non-transitory computer readable recording medium that records a program executable by a controller to execute a controlling method of an electronic apparatus according to one or more embodiments, the controlling method includes, based on a gesture of a user photographed through the camera being a capture gesture that is a predetermined gesture, obtaining information regarding a setting state of at least one of an electronic apparatus or an external device connected to the electronic apparatus, controlling the display to display a UI including information regarding a predetermined setting state, and based on a first gesture using a specific object being input while the UI is displayed, matching the first gesture with the obtained information regarding the setting state and storing the first gesture matched with the obtained information regarding the setting state as a custom gesture.

Effect of Invention

As described above, according to one or more embodiments, an electronic apparatus may conveniently control the setting states of the electronic apparatus and an external device through a custom gesture defined by a user, and improve the problems of misrecognizing a gesture and subsequent malfunctions.

BRIEF DESCRIPTION OF DRAWINGS

FIG. 1 is a block diagram provided to explain configuration of an electronic apparatus according to one or more embodiments;

FIG. 3 is a flowchart provided to explain a method in which an electronic apparatus changes conditions for displaying a first UI according to one or more embodiments;

FIGS. 6A to 6D are views provided to explain a process of storing a custom gesture according to one or more embodiments;

FIGS. 7A to 7D are views provided to explain a process of storing a custom gesture according to one or more embodiments;

5

Figure 2A:
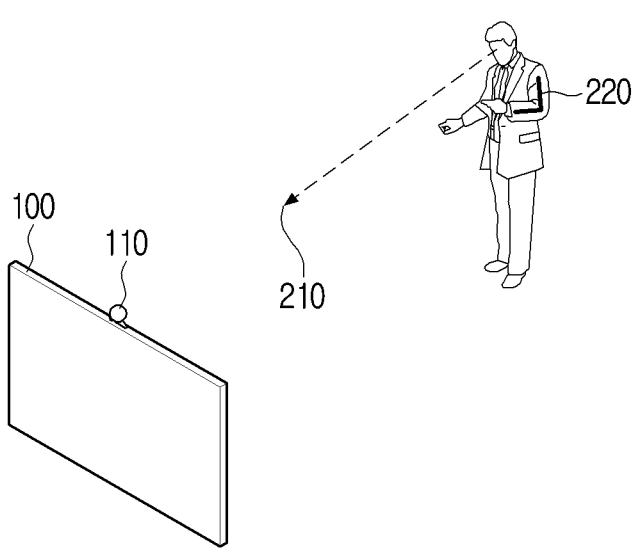
FIGS. 2A to 2B are views provided to explain a method of displaying a first UI indicating that an electronic apparatus is recognizing a gesture according to one or more embodiments.

6 of an electronic apparatus or an external device connected to the electronic apparatus with a custom gesture and storing the same according to one or more embodiments.

DETAILED DESCRIPTION OF EXEMPLARY EMBODIMENTS

The disclosure may be variously modified and have various embodiments and thus, specific embodiments are shown in the accompanying drawings and described in detail in the specification. However, it is to be understood that the scope of the disclosure is not limited to the specific embodiments, and includes various modifications, equivalents, or alternatives according to the embodiments of the disclosure. Throughout the accompanying drawings, similar components are denoted by similar reference numerals.

In describing the disclosure, the description omits a detailed description of a case where the detailed description for the known functions or configurations related to the disclosure is determined to unnecessarily obscure the gist of the disclosure.

In addition, the following embodiments may be modified in various different forms, and the scope and spirit of the disclosure are not limited to the following embodiments. Rather, these embodiments are provided to make the disclosure thorough and complete, and to completely transfer the spirit of the disclosure to those skilled in the art.

Terms used in the disclosure are used only to describe the specific embodiments rather than limiting the scope of the disclosure. A term of a singular number may include its plural number unless explicitly indicated otherwise in the context.

In the disclosure, an expression "have," "may have," "include," "may include" or the like, indicates existence of a corresponding feature (for example, a numerical value, a function, an operation or a component such as a part), and does not exclude existence of an additional feature.

In the disclosure, expressions "A or B," "least one of A and/or B," "one or more of A and/or B" and the like, may include all possible combinations of items enumerated together. For example, "A or B," "at least one of A and B" or "at least one of A or B" may indicate all of 1) a case where at least one A is included, 2) a case where at least one B is included, or 3) a case where both of at least one A and at least one B are included.

Expressions "first," "second" and the like, used in the disclosure may indicate various components regardless of a sequence or importance of the components. These expressions are used only to distinguish one component from another component, and do not limit the corresponding components.

When it is mentioned that any component (for example: a first component) is (operatively or communicatively) coupled with/to or is connected to another component (for example: a second component), it is to be understood that any component is directly coupled to another component or may be coupled to another component through the other component (for example: a third component).

On the other hand, when it is mentioned that any component (for example, a first component) is "directly coupled" or "directly connected" to another component (for example, a second component), it is to be understood that the other component (for example, a third component) is not present between any component and another component.

An expression "~configured (or set) to" used in the disclosure may be replaced by an expression, for example, "suitable for," "having the capacity to," "~designed to," "~adapted to," "~made to," or "~capable of" depending on a situation. A term "~configured (or set) to" may not necessarily mean "specifically designed to" in hardware.

Instead, an expression "~an apparatus configured to" may mean that the apparatus "is capable of" together with other apparatuses or components. For example, a "processor configured (or set) to perform A, B, and C" may mean a dedicated processor (for example, an embedded processor) for performing the corresponding operations or a generic-purpose processor (for example, a central processing unit (CPU) or an application processor) that may perform the corresponding operations by executing one or more software programs stored in a memory apparatus.

In the embodiments, a "module" or a "~er/or" may perform at least one function or operation, and be implemented by hardware or software, or be implemented by a combination of hardware and software. In addition, a plurality of "modules" or a plurality of "~ers/ors" may be integrated in at least one module and implemented by at least one processor except for a "module" or an "~er/or" that needs to be implemented by specific hardware.

Meanwhile, various elements and regions in the drawings are schematically shown. Therefore, the spirit of the disclosure is not limited by relative sizes or intervals shown in the accompanying drawings.

Hereinafter, the embodiments of the disclosure are described in detail with reference to the accompanying drawings for those skilled in the art to which the disclosure pertains to easily practice the disclosure.

Figure 1:
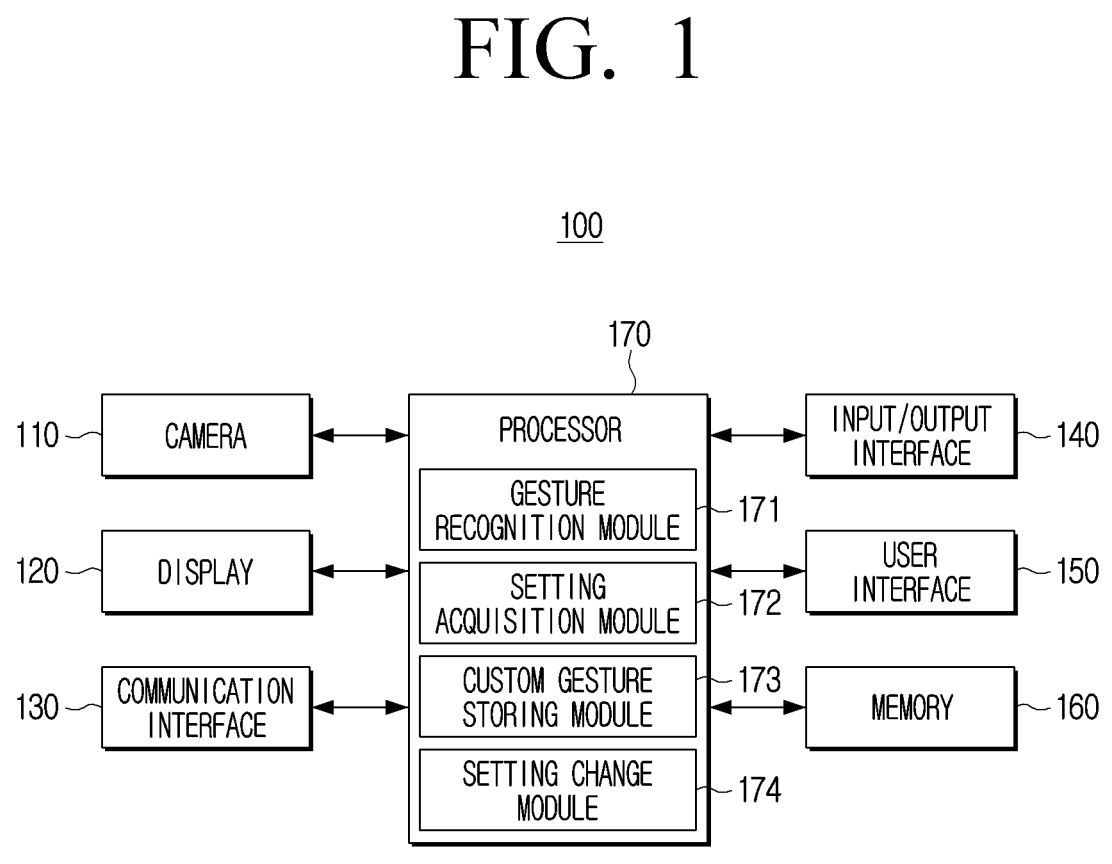

FIG. 1 is a block diagram provided to explain configuration of an electronic apparatus 100 according to one or more embodiments.

Referring to FIG. 1, the electronic apparatus 100 may include a camera 110, a display 120, a communication interface 130, an input/output interface 140, a user interface 150, a memory 160, and a processor 170. Among the components of the electronic apparatus 100, at least some of them may be omitted, and other components may be further included. The electronic apparatus 100 may be a TV, but this is only an example. The electronic apparatus 100 may be implemented as other devices such as a monitor and a set-top box.

The camera 110 may obtain an image regarding at least one object. The camera 110 may include an image sensor, and the image sensor may convert light coming through a lens into an electrical image signal. In particular, the camera 110 may obtain an image by photographing a user's body and gaze. The processor 170 may obtain information regarding the user's hand motion and the angle of the user's arm by analyzing the user's hand area and arm area included in the obtained image.

The display 120 may output image data under the control of the processor 170. Specifically, the display 120 may output an image pre-stored in the memory 160 under the control of the processor 170. In addition, the display 120 may display a user interface stored in the memory 160. The display 120 may be implemented as a Liquid Crystal Display Panel (LCD), an Organic Light Emitting Diodes (OLED), etc., but in some cases, may be implemented as a flexible display, a transparent display, etc. However, the display 120 according to one or more embodiments is not limited to a specific type. In particular, the display 120 may display a first UI informing that a gesture is being recognized, a second UI including information regarding a setting state of at least one of the electronic apparatus 100 or an external device connected to the electronic apparatus 100, and a third UI for storing a custom gesture.

The communication interface 130 includes a circuitry and may communicate with an external device and a server. The communication interface 130 may perform communication with an external device and a server based on a wired or wireless communication method. According to one or more embodiments, the communication interface 130 may perform communication with an external device and a server through wireless communication. In this case, the communication interface 130 may include a wireless-fidelity (Wi-Fi) module (not shown), a Bluetooth module (not shown), an infrared (IR) module, a local area network (LAN) module, an Ethernet module, or the like. Here, each communication module may be implemented in the form of at least one hardware chip. In addition to the above-described communication methods, a wireless communication module may include at least one communication chip performing the communication based on various wireless communication standards such as zigbee, universal serial bus (USB), mobile industry processor interface camera serial interface (MIPI CSI), third generation (3G), 3rd generation partnership project (3GPP), long term evolution (LTE), LTE advanced (LTE-A), 4th generation (4G), and 5th generation (5G). However, this configuration is only an example, and the communication interface 130 may use at least one communication module among various communication modules. Meanwhile, a communication interface performing communication with an external device and a communication interface performing communication with a server may be implemented as different interfaces. In particular, when an external device is connected through the communication interface 130, the communication interface 130 may receive setting information regarding the setting state of the external device. The electronic apparatus 100 may be connected to an external device directly or indirectly through the communication interface 130, but this is only an example. The electronic apparatus 100 may be connected to an external device in various methods, such as through an Access Point (AP).

The input/output interface 140 may be implemented as a port provided in the electronic apparatus 100. In particular, the input/output interface 140 may be implemented as a High Definition Multimedia Interface (HDMI) port and may communicate with an external device. In this case, the external device may also include an HDMI port. Accordingly, the electronic apparatus 100 and the external device may perform communication through each HDMI port and an HDMI cable. However, this is only an example, and the communication interface 130 may perform communication with an external device through a Low Voltage Differential Signals (LVDS) cable, a Digital Visual Interface (DVI) cable, a D-subminiature (D-SUB) cable, a Video Graphics Array (VGA) cable, a V-by-One cable, an optical cable, etc. In particular, when an external device is connected through the input/output interface 140, the input/output interface 140 may receive information regarding the setting state of the external device.

The user interface 150 may be implemented as buttons, a touch pad, a mouse, a keyboard, etc., or may be implemented as a touch screen capable of performing both a display function and a manipulation input function. Here, the buttons may be various types of buttons such as mechanical buttons, a touch pad, a wheel, etc. formed on an arbitrary region such as the front, side, or rear portion of the appearance of the main body of the electronic apparatus 100.

The memory 160 may store at least one instruction regarding the electronic apparatus 100. In addition, the memory 160 may store an Operating System (O/S) for running the electronic apparatus 100. Further, the memory 160 may store various software programs or applications for the operation of the electronic apparatus 100 according to one or more embodiments. The memory 160 may also include a semiconductor memory such as a flash memory or a magnetic storage medium such as a hard disk.

Specifically, the memory 160 may store various software modules for the operation of the electronic apparatus 100 according to one or more embodiments, and the processor 170 may control the operation of the electronic apparatus 100 by executing the various software modules stored in the memory 160. In other words, the memory 160 may be accessed the 170, and by processor reading/recording/modifying/deleting/updating of data by the processor 170 may be performed.

Meanwhile, in the present disclosure, the term "the memory 160" may be meant to include the memory 160, a ROM (not shown) or a RAM (not shown) in the processor 170, or a memory card (not shown) (e.g., a micro SD card or a memory stick) mounted in the electronic apparatus 100.

The processor 170 may control the overall operations and functions of the electronic apparatus 100. The processor 170 controls the overall operations of the electronic apparatus 100. Specifically, the processor 170 is connected to configuration of the electronic apparatus 100 including the memory 160, and by executing at least one instruction stored in the memory 160 as described above, may control the overall operations of the electronic apparatus 100.

The processor 170 may be implemented in various ways. For example, the processor 170 may be implemented as at least one of an application specific integrated circuit (ASIC), an embedded processor, a microprocessor, hardware control logic, a hardware finite state machine (FSM), and a digital signal processor (DSP). Meanwhile, in the present disclosure, the term "the processor 170" may be meant to include a Central Processing Unit (CPU), a Graphic Processing Unit (GPU), a Main Processing Unit (MPU), and the like.

The processor 170 may include a gesture recognition module 171, a setting acquisition module 172, a custom gesture storing module 173, and a setting change module 174. A plurality of modules according to one or more embodiments may be implemented as software modules or hardware modules. When the plurality of modules are implemented as software modules, the processor 170 may access the software modules by loading the software modules stored in the memory 160.

The gesture recognition module 171 may recognize a user's gesture from the user's body photographed through the camera 110. Specifically, the shape of the user's gesture may be recognized from the user's hand motion photographed through the camera 110. The recognition of a gesture (motion) means recognizing the user's gesture based on the dynamic image information obtained from the camera 110.

The gesture recognition module 171 may recognize not only a gesture of the user who does not use a specific object but also a gesture of the user who is using a specific object. The specific object may be an external device connected to the electronic apparatus 100, but this is only an example. The specific object may be an object that is not connected to the electronic apparatus 100. For example, the specific object may include at least one of a game controller, a mouse, a remote controller, or a mobile phone.

The gesture recognition module 171 may recognize the gesture of holding a game controller with both hands and pressing a specific button on the controller with the right hand. The gesture recognition module 171 may immediately recognize a user gesture in a photographed image, but this is only an example. The gesture recognition module 171 may recognize a user gesture and a specific object separately. For example, the gesture recognition module 171 may divide a photographed image into an area including a gesture and an area including a specific object and then, recognize the gesture and the specific object separately. In this case, the gesture recognition module 171 may recognize the specific object using an object recognition algorithm.

The gesture recognition module 171 may recognize a gesture using a gesture recognition algorithm stored in the memory 160. The gesture recognition algorithm may re-align the recognized hand, compare the shape of the photographed hand with a gesture in a pose data set, and determine a gesture corresponding to the pose data with the highest suitability in the pose data set as a recognized gesture. The pose data set may be pre-stored in the memory 160, or may be stored in an external device or external server.

In addition, the gesture recognition module 171 may recognize a specific object by analyzing a photographed image, but this is only an example. The gesture recognition module 171 may receive a signal from a specific object and recognize the specific object. The gesture recognition module 171 may recognize a specific object by receiving a signal from the specific object, and recognize a user's gesture using a gesture recognition algorithm. The gesture recognition module 171 may recognize a gesture of the user who uses a specific object using the recognized specific object and the recognized gesture. For example, when receiving information that a specific button of a game controller is being pressed from the game controller that is an external device connected to the electronic apparatus 100, the gesture recognition module 171 may recognize an operation where the user's gesture is pressing a button of the specific object with the right hand and accordingly, recognize the gesture of pressing a specific button of the game controller.

The gesture recognition module 171 may recognize a case in which the user intends to use a gesture and when it is determined that there is the user's intention, the gesture recognition module 171 may control the display 120 to display a first UI informing that the gesture is being recognized. For example, when the angle of the user's arm belongs to a predetermined range (e.g., 40° to 90°) and the user's gaze is directed toward the electronic apparatus 100 for more than a threshold time (e.g., 1 second), the gesture recognition module 171 may control the display 120 to display the first UI. The first UI may be a UI that does not disturb a viewing experience. For example, the first UI may be a UI in which light is subtly displayed visually on the top of the display 120.

The specific feature regarding how the first UI is displayed will be described in detail with reference to FIGS. 2A and 2B.

When the user makes a gesture while the first UI is displayed, the gesture recognition module 171 may recognize the user's gesture from the photographed user's gesture operation. Accordingly, it is possible to prevent a problem in which a gesture is recognized when the user does not intend to use the gesture.

The gesture recognition module 171 may change the conditions for displaying the first UI based on whether a capture gesture that is a predetermined gesture or a custom gesture is recognized while the first UI informing that a gesture is being recognized by the electronic apparatus 100 is displayed. The conditions for displaying the first UI may be that the user's gaze is directed toward the electronic apparatus for more than a threshold time and the angle of the arm of the user's body is within a predetermined range. Specifically, when a capture gesture or a custom gesture is not recognized while the first UI is displayed, the gesture recognition module 171 may change the range of the conditions for displaying the first UI (e.g., the angle of the arm, the time during which the user's gaze is directed toward the electronic apparatus, etc.).

The specific feature of changing the conditions for displaying the first UI will be described in detail with reference to FIG. 3.

When a capture gesture that is a predetermined gesture is recognized by the gesture recognition module 171, the setting acquisition module 172 may obtain information regarding the setting state of at least one of the electronic apparatus 100 or an external device connected to the electronic apparatus 100. However, this is only an example, and the setting acquisition module 172 may obtain information regarding the setting state in various input methods including the method of inputting through the user interface 150 in addition to the capture gesture.

The capture gesture may be a predetermined gesture to obtain (or capture) information regarding the current setting state, match the information with the user's gesture and store the first gesture matched with the information as a custom gesture.

The information regarding the setting state may include information regarding a screen source, information regarding customized information and information regarding an external device. However, this is only an example, and the information regarding the setting state may include information regarding the setting state of the other electronic apparatuses and external devices.

The information regarding a screen source may be information regarding the communication interface 130 and the input/output interface 140 that receives information appearing on the screen of the display 120 of the electronic apparatus 100. Specifically, the information regarding a screen source may include information regarding the communication interface 130 and the input/output interface 140 that receive information appearing on the screen that is currently output to the display 120. For example, when the screen currently displayed on the display 120 is a screen output through the HDMI 1 input/output interface 140, the information regarding a screen source may include information regarding HDMI 1. Alternatively, when the currently displayed screen is an application execution screen, the information regarding a source screen may include information regarding the application that is currently executed. Alternatively, the information regarding a screen source may include information regarding an operation in which the electronic apparatus 100 operates in association with an external device such as mirroring or remote access.

The information regarding customized information may be a plurality of pieces of information set within the electronic apparatus 100. Specifically, the customized information may include screen setting information, sound setting information, account information, and content viewing information. The screen setting information may be information regarding screen brightness, screen contrast and screen color temperature. The sound setting information may be volume information. The account information may be information regarding the account currently being accessed. The content viewing information may be information regarding the content currently being viewed. For example, when a user is watching a TV, the content viewing information may be information regarding the channel number currently being viewed and information regarding the drama currently being viewed.

The information regarding an external device may be setting information regarding the external device connected to the electronic apparatus 100. Specifically, the information regarding an external device may include information regarding the device connected to the electronic apparatus 100 through the communication interface 130 or the input/output interface 140. For example, the information regarding an external device may include information that the air conditioner is turned on and information that the indoor light is turned off. Alternatively, the information that the electronic apparatus 100 is connected to a keyboard, a mouse, an earphone, or a headset may be included.

The custom gesture storing module 173 may control the display 120 to display the second UI including obtained information regarding the setting state based on the obtained information regarding the setting state. The custom gesture storing module 173 may display the second UI including information regarding the setting state that can be stored on the display 120.

Meanwhile, the second UI may include a plurality of UI elements corresponding to information regarding a plurality of setting states, respectively. The plurality of UI elements may visually represent information regarding the plurality of setting states.

When a user input for selecting at least one of the plurality of UI elements is sensed, the custom gesture storing module 173 may select information regarding the setting state corresponding to the selected UI element among information regarding the plurality of setting states. In other words, based on the second UI, the range of the setting state that is matched and stored with the custom gesture may be selected. For example, the setting acquisition module 172 may change the range of the information regarding the setting state stored based on the distance between the user's hands or the direction directed by the hands.

The method that the custom gesture storing module 173 displays the second UI including information regarding the setting state and selects the UI element corresponding to information regarding the plurality of setting states, respectively, will be described later in detail with reference to FIGS. 4A and 4E.

When a first gesture to be stored as a custom gesture is input while the second UI is displayed, the custom gesture storing module 173 may match the input first gesture with the obtained information regarding the setting state and store the first gesture matched with the obtained information regarding the setting state as the custom gesture. Meanwhile, when an input for selecting at least one of the UIs corresponding to the plurality of setting states is sensed through the second UI, the custom gesture storing module 173 may match information regarding the setting state corresponding to the selected UI element with the input gesture and store the first gesture matched with the information regarding the setting state corresponding to the selected UI element with the input gesture as a custom gesture. The custom gesture may mean a gesture for applying information regarding the setting state stored in the memory 160 to the electronic apparatus 100 and an external device connected to the electronic apparatus 100. In this case, the information regarding the setting state that is matched and stored with the input gesture may collectively store the obtained information regarding the setting state, but this is only an example. The information regarding the setting state may match and store information regarding the selected setting state from among information regarding the plurality of setting states with the input gesture.

When information regarding the setting state is obtained or an input for selecting at least one of the UI elements corresponding to the plurality of setting states, respectively, is input through the second UI, the custom gesture storing module 173 may control the display 120 to display the third UI for storing a custom gesture.

When the first gesture to be stored as a custom gesture is recognized while the third UI is displayed, the custom gesture storing module 173 may control the display 120 to display the first UI element for indicating an input degree of the first gesture until the first gesture is input.

The first UI element may include the first image that visually represents the first gesture.

The custom gesture storing module 173 may change the first UI element so that the shape of the first UI element can be clarified according to the input degree of the first gesture while the first gesture is input.

For example, while the input degree of the first gesture is changed, the custom gesture storing module 173 may change the display of a partial area of the entire area of the shape of the first UI element, and the ratio of the partial area compared to the entire area may correspond to the ratio of the current input degree. Alternatively, custom gesture storing module 173 may indicate the input degree of the first gesture through a progress bar by displaying the progress bar on the display 120. However, this is only an example, and the custom gesture storing module 173 may change the first UI element in various methods such as changing the color, luminance, brightness, contrast, etc. so that the shape of the first UI element is clarified. When the first gesture is changed to the second gesture while the first UI element is changed, the custom gesture storing module 173 may change the first UI element to the second UI element and in this case, the second UI element may change the image to the second image that visually represents the second gesture.

When a gesture is input while the third UI is displayed, the custom gesture storing module 173 may match the input gesture with the obtained information regarding the setting state and store the input gesture matched with the obtained information regarding the setting state as a custom gesture. Meanwhile, when an input for selecting at least one of the UI elements corresponding to a plurality of setting states, respectively, is sensed through the second UI, the custom gesture storing module 173 may match information regarding the setting state corresponding to the selected UI element with the input gesture and store the input gesture matched with the setting state corresponding to the selected UI element with the input gesture as a custom gesture.

In this case, the input gesture may be a gesture of a user using a specific object. When a gesture of the user who is using a specific object is input, the custom gesture storing module 173 may match the gesture of the user using the specific object with the obtained information regarding the setting state and store the gesture of the user matched with the obtained information regarding the setting state as a custom gesture. For example, the operation of pressing a specific button with the right hand while holding a game controller that is an external device connected to the electronic apparatus 100 with both hands may be input as a gesture. In this case, the information regarding the setting state that is matched and stored with the input gesture may be information corresponding to the specific object. For example, when the specific object is a game controller, the stored information regarding the setting state may be setting state information of the electronic apparatus 100 to run game and the external device connected to the electronic apparatus 100. Based on the stored setting state information to run the game, the electronic apparatus 100 may receive image information through a game set-top box and change the lighting of the external device connected to the electronic apparatus 100 to weak lighting so that the game screen can be seen clearly.

The method of display the third UI and changing the UI element included in the third UI will be described in detail with reference to FIG. 5, FIGS. 6A to 6D and FIGS. 7A to 7D.

In addition, the input gesture of the user may be a gesture selected by the user among predetermined gestures.

The method of inputting a gesture by the user's selection of one of the predetermined gestures will be described in detail with reference to FIG. 8.

The custom gesture storing module 173 may visually provide recognition regarding the gesture input process through the third UI, thereby inducing a natural interaction between the user and the electronic apparatus 100. The user may visually check the recognized gesture and change the hand shape if a different gesture is wanted.

When the user's gesture photographed through the camera 110 is the custom gesture, in other words, the custom gesture is recognized by the gesture recognition module 171, the setting change module 174 may change the setting state of the electronic apparatus 100 and the external device connected to the electronic apparatus 100 based on information regarding the stored setting state matched with the custom gesture. Specifically, information regarding the setting state of at least one of the electronic apparatus 100 or the external device connected to the electronic apparatus 100 at the time when the custom gesture is stored may be matched with the custom gesture and stored in the memory 160. Subsequently, when the gesture recognition module 171 recognizes the stored custom gesture, information regarding the setting state of the current electronic apparatus 100 and the external device connected to the electronic apparatus 100 to correspond to the stored information regarding the setting state.

When the recognized custom gesture is a gesture of recognizing a specific object, the specific object may include at least one of a game controller, a mouse, a remote controller, or a mobile phone. In this case, the setting change module 174 may change the setting state of the electronic apparatus 100 and the external device connected to the electronic apparatus 100 based on information regarding the setting state corresponding to the specific object among information regarding the setting state stored in the memory 160. For example, when a custom gesture using a game controller is recognized, the setting change module 174 may change the setting state of the electronic apparatus 100 and the external device connected to the electronic apparatus 100 based on information regarding the setting state for running a game. For example, when the specific object is a game controller, information regarding the setting state for running a game may be setting state information in which the input/output interface 140 of the electronic apparatus 100 is connected to a game set-top box and the brightness of the external lighting device is appropriate for viewing the game screen. According to another embodiment, when the specific object is a remote controller, information regarding the setting state corresponding to the remote controller may be information regarding the setting state for viewing a TV. The information regarding the setting state for viewing a TV may be information in which the electronic apparatus 100 displays the TV viewing screen on the display 120 and the external lighting has brightness appropriate for the TV viewing environment.

The method of changing the setting state of the electronic apparatus 100 and the external device connected to the electronic apparatus 100 using a custom gesture will be described in detail with reference to FIG. 7.

For example, the setting state information at the time when the custom gesture is registered may indicate that the input interface of the electronic apparatus 100 is set to HDMI 1 and the power of the lighting connected to the electronic apparatus 100 is turned off. When the custom gesture is recognized after the setting state information matching the custom gesture is stored in the memory 160, the setting change module 174 may set the screen input of the electronic apparatus 100 to HDMI 1 according to the stored setting state information and control to turn off the power of the lighting connected to the electronic apparatus 100.

Figure 2B:
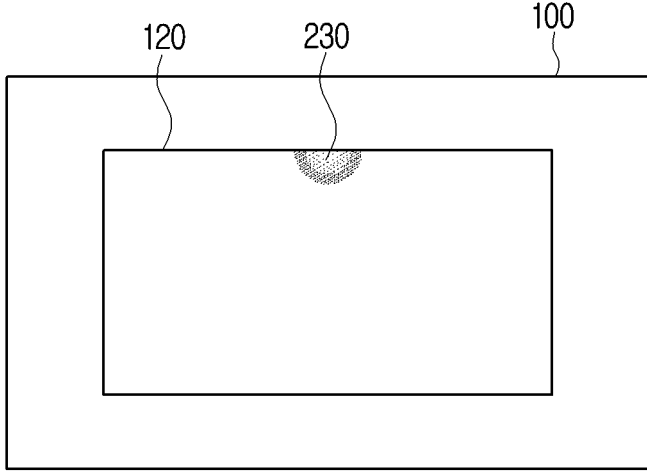

FIGS. 2A to 2B are views provided to explain a method of displaying a first UI indicating that an electronic apparatus is recognizing a gesture according to one or more embodiments.

Referring to FIG. 2A, the camera 110 of the electronic apparatus 100 may obtain an image by photographing the user's body and gaze. The user's body may mean the user's hand area and arm area. The processor 170 may determine the user's intention to use the gesture from the photographed image. Specifically, when the gesture indicates that the user's gaze is directed toward the electronic apparatus 100 for more than a threshold time and the angle at which the arm of the user's body is bent is within a predetermined range, the processor 170 of the electronic apparatus 100 may determine that the user has the intention to use the gesture. For example, when the threshold time is 2 seconds and the predetermined range is 60° to 150°, the user's gaze 110 may be directed toward the electronic apparatus 100 for 3 seconds and the angle 220 at which the arm of the user's body is bent may be 90°. In this case, since the user's gaze is directed toward the electronic apparatus 100 for more than the threshold time and the angle at which the arm of the user's body is within the predetermined range, the processor 170 may determine that the user has the intention to use the gesture.

Referring to FIG. 2B, the processor 170 may determine a case in which there is the user's intention to use a gesture, and display the first UI 230 indicating that the electronic apparatus 100 is recognizing the gesture. For example, the processor 170 may control the display 120 to display the first UI on the display 120 of the electronic apparatus 100. However, this is only an example, the first UI may be displayed on another component of the electronic apparatus 100, not on the display 120, or may be displayed on an external device connected to the electronic apparatus 100.

The first UI may be a UI that does not interfere with the user's experience of using the electronic apparatus 100. For example, when the electronic apparatus 100 is a TV, the processor 170 may display the first UI 230 by displaying visually subtle light on the top of the display 120 in order not to disturb the user's viewing experience. However, this is only an example, and the processor 170 may use various methods such as displaying the first UI in another area, not on the top of the display 120, displaying it in a different method, flickering light provided on a bezel of the display 120, flickering the light of an external device connected to the electronic apparatus 100, etc.

FIG. 3 is a flowchart provided to explain a method in which the electronic apparatus 100 changes conditions for displaying the first UI according to one or more embodiments.

The electronic apparatus 100 may photograph the user's body and gaze through the camera 110 (S310).

The processor 170 may sense that the user's gaze is directed toward the electronic apparatus for more than a threshold time and the angle of the arm of the body is within a predetermined range (S320).

In this case, the processor 170 may display the first UI informing that the electronic apparatus 100 is recognizing a gesture (S330).

While the first UI is displayed, the processor 170 may recognize whether a capture gesture that is a predetermined gesture or a custom gesture is input (S340).

When a capture gesture that is a predetermined gesture or a custom gesture is input while the first UI is displayed (S340-Y), the electronic apparatus 100 may perform a function corresponding to the capture gesture that is a predetermined gesture or the custom gesture. Specifically, when a capture gesture is input, the electronic apparatus 100 may perform the operation process of matching and storing the capture gesture with setting state information.

When a capture gesture that is a predetermined gesture or a custom gesture is not input while the first UI is displayed (S340-N), the processor 170 may change at least one of a threshold time or a predetermined range included in conditions for displaying the first UI.

Specifically, when a capture gesture that is a predetermined gesture or a custom gesture is not input while the first UI is displayed, the processor 170 may change the threshold time and the predetermined range based on information sensed by the processor 170 so that the first UI is not displayed when the user performs the same operation. For example, the threshold time may be 2 seconds and the predetermined range may be 40° to 80°. In this case, the first UI may be displayed as the user's gaze is directed toward the electronic apparatus 100 for 3 seconds and the angle of the user's arm is sensed at 45°. If a capture gesture that is a predetermined gesture or a custom gesture is not input while the first UI is displayed, the threshold time may be changed to 4 seconds, that is more than 3 seconds, and the predetermined range may be changed to 50°, that is more than 45°.

Accordingly, the processor 170 may change the conditions for displaying the first UI to be suitable for the user, thereby improving the accuracy of recognizing the user's intention to use a gesture.

FIGS. 4A to 4E are views provided to explain a method of displaying a second UI and selecting information regarding a setting state according to one or more embodiments.

Figure 4A:
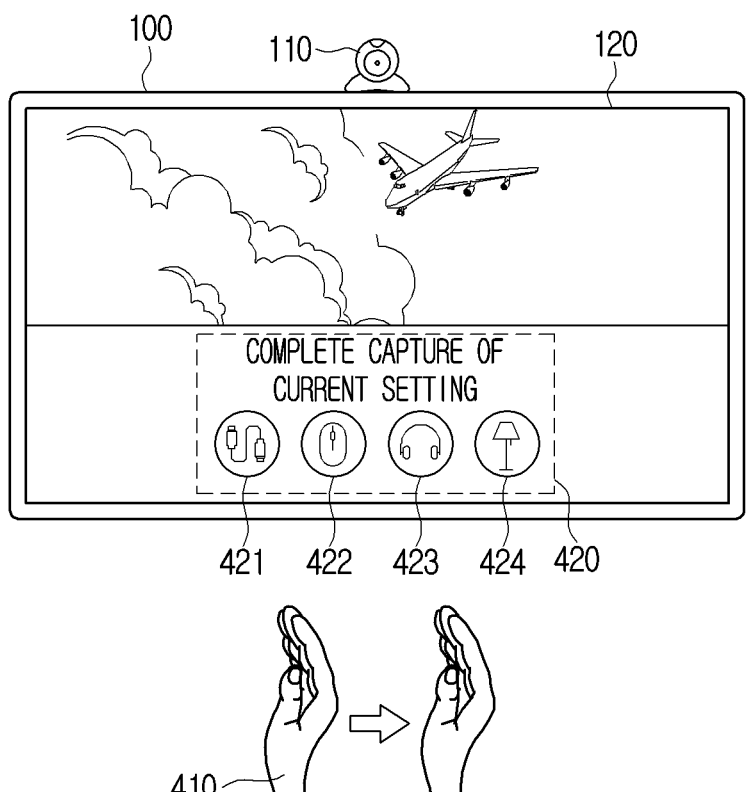
FIGS. 4A to 4E are views provided to explain a method of displaying a second UI and selecting information regarding a setting state according to one or more embodiments.

Referring to FIG. 4A, the processor 170 may recognize the user's gesture photographed through the camera 110 as a capture gesture 410 that is a predetermined gesture. Here, the user may take the capture gesture 410 that is a predetermined gesture. The capture gesture is a gesture preset by the manufacturer of the electronic apparatus 100 and may be, for example, a palm gesture in which the palm is opened and moved more than a threshold distance. However, this is only an example, and the capture gesture may be a different gesture. In addition, the capture gesture may be a gesture set by the user separately.

When the capture gesture is recognized, the processor 170 may obtain information regarding the electronic apparatus 100 and an external device connected to the electronic apparatus 100.

The processor 170 may display a second UI 420 including information regarding the setting state based on the obtained information regarding the setting state. Meanwhile, the second UI may include a plurality of UI elements including information regarding a plurality of setting states. The plurality of UI elements may visually represent information regarding the plurality of setting states. For example, the screen of the electronic apparatus 100 may be input through HDMI 1, the electronic apparatus 100 may be manipulated through the user's keyboard, the sound of the electronic apparatus 100 is output through a wireless headset, and the lighting connected to the electronic apparatus 100 may be turned on. For example, the second UI may include the first UI element corresponding to the screen setting (e.g., HDMI) of the electronic apparatus, the second UI element corresponding to the state of the second external device (e.g., a mouse) connected to the electronic apparatus 100, the third UI element corresponding to the state of the second external device (e.g., a wireless headset) connected to the electronic apparatus 100, and the fourth UI element corresponding to the state of the third external device (e.g., external lighting) connected to the electronic apparatus 100.

Figure 4B:
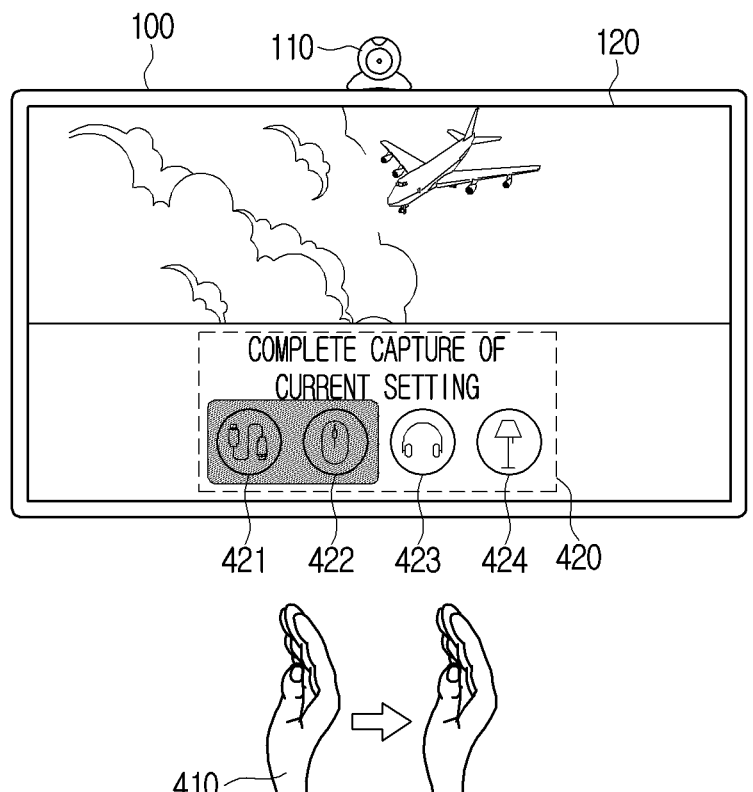

Referring to FIG. 4B, when a user input for selecting at least one of a plurality of UI elements is sensed, the processor 170 may select a setting state corresponding to the selected UI element from among the plurality of setting states. The processor 170 may change the second UI screen to show the selected UI element.

For example, the processor 170 may display the selected first UI element 421, and the second UI element 422 may display a separate shade on the second UI 420. Here, the user input for selecting one of the plurality of UI elements may be the user's gesture, but this is only an example. There may be various user inputs for selecting at least one of the plurality of elements, such as an input through the user interface 150.

Figure 4C:
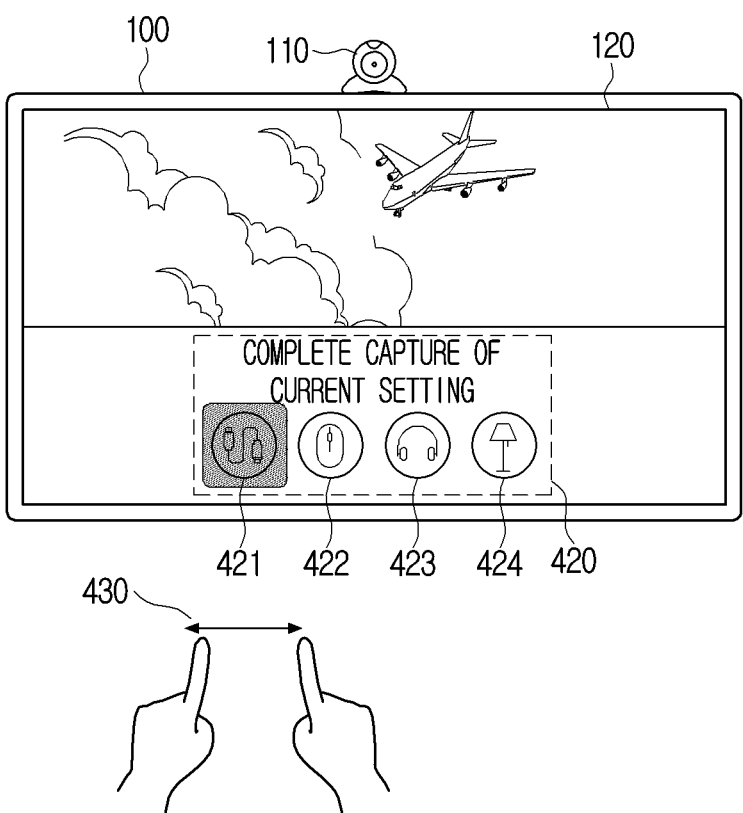

Referring to FIG. 4C, in order to select at least one of the plurality of UI elements, the processor 170 may selecting a UI element based on the distance between the user's two hands. For example, when the distance between the hands is sensed as a first distance 430, the processor 170 may select a UI element based on the first distance. When the first UI element is selected, the processor 170 may indicate on the second UI 420 that the first UI element 421 has been selected.

Figure 4D:
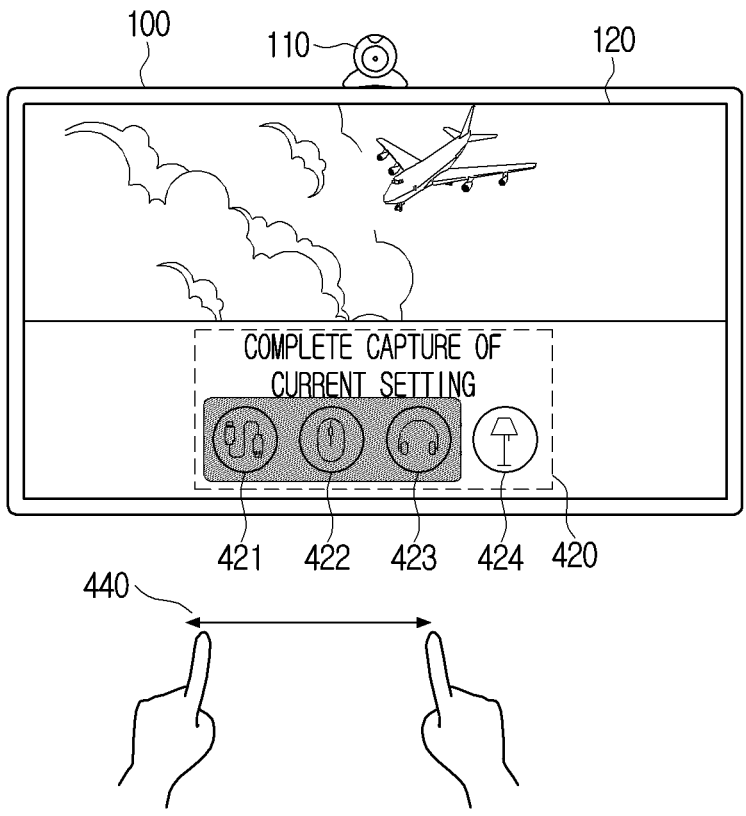

Referring to FIG. 4D, when the distance between the user's hands is sensed as a second distance 440, the processor 170 may select the first UI element 421, the second UI element 422, and the third UI element 423 and display the selected UI elements on the display 120. When the second distance 440 is larger than the first distance 430, the number of UI elements selected may be greater in the case of the second distance.

Figure 4E:
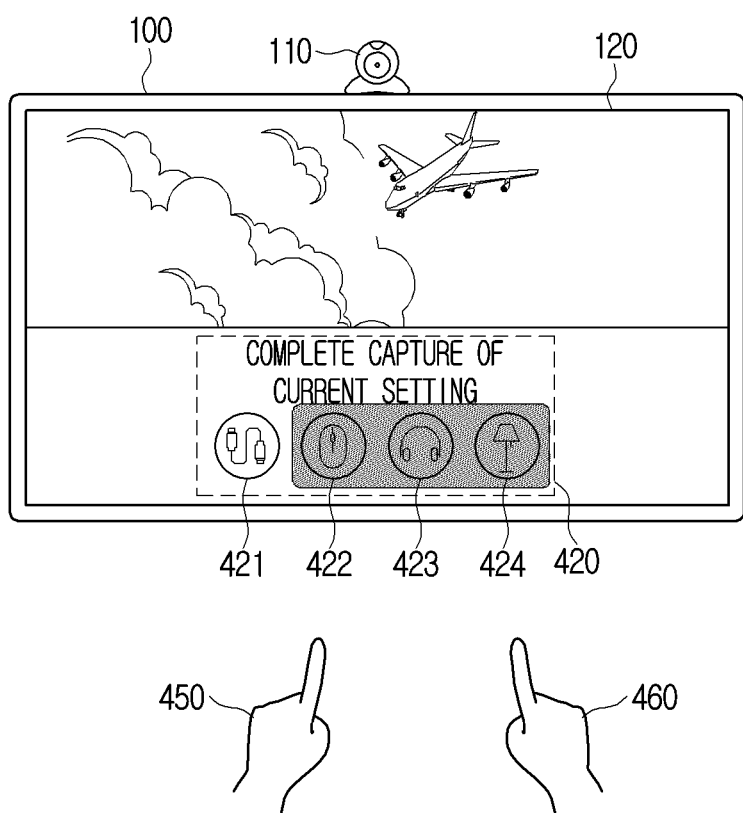
Figure 5:
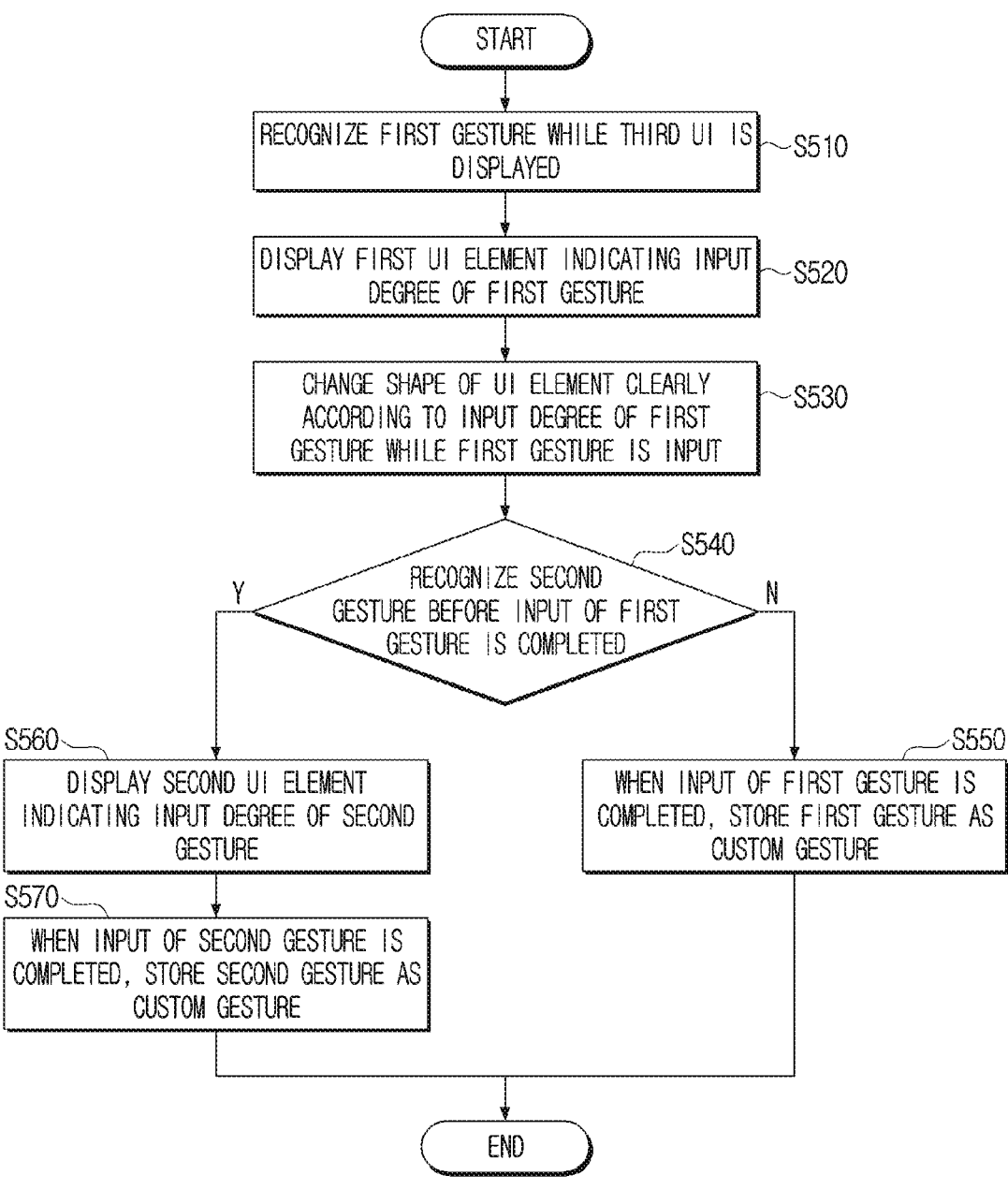
FIG. 5 is a view provided to explain a process of storing a custom gesture according to one or more embodiments.

Referring to FIG. 4E, the processor 170 may select a UI element by sensing the direction in which the user's finger is pointing. For example, when the direction directed by the user's left finger (see reference numeral 450) is the second UI element 422 and the direction directed by the right finger (see reference numeral 460) is the fourth UI element, the processor 170 may select the second UI element 422, the third UI element 423 and the fourth UI element 424.

When at least one of a plurality of UI elements is selected, the processor 170 may match information regarding the setting state corresponding to the selected UI element with the gesture input by the user and store it as a custom gesture.

FIG. 5, FIGS. 6A to 6D and FIGS. 7A to 7D are views provided to explain the process of storing a custom gesture according to one or more embodiments.

Referring to FIGS. 6A and 7A, the processor 170 may control the display 120 to display a third UI 620, 720 for storing a custom gesture.

While the third UI for storing a custom gesture is displayed, the gesture 610, 710 may be recognized (S510). Referring to FIGS. 6A to 6D, the gesture recognized here may mean a gesture of the user who uses a specific object. Referring to FIGS. 7A to 7D, the gesture recognized here may mean a gesture that does not use a specific object. The processor 170 may control the display 120 to display the first UI element 621, 721 for indicating the input degree of the first gesture 610, 710 until the input of the first gesture 610, 710 is completed (S520).

The first UI element 621, 721 may include the first image that visually represents the first gesture. The processor 170 may reconstruct the shape of the user's hand and visually represents it. The user may clearly recognize the gesture that he or she registers through the first image.

While the first gesture is input, the processor 170 may change the UI element so that the shape of the UI element becomes clear according to the input degree of the first gesture (S530). For example, while the input degree of the first gesture changes, the processor 170 may change the display of a partial area of the entire area of the shape of the first UI element, and the ratio of the partial area of the entire area may correspond to the ratio of the current input degree.

The method of changing the shape of the UI element may be a method of using a gesture input progress increase/decrease algorithm. Specifically, the camera 110 may photograph the user's first gesture at n or more frames per second. The processor 170 may convert the photographed gesture to a plurality of 3D landmarks for each frame. When the difference between the point recognized in the previous frame and the landmark recognized in the current frame is equal to or less than a threshold, the processor 170 may determine that a first gesture 610 is maintained. When the first gesture 610 is maintained, the input progress of the first gesture 610 may start from 0% and increase until it reaches 100%. As the input progress increases, the processor 170 may control the display 120 so that the shape of the UI element becomes clarified in accordance with the increase in input progress.

Referring to FIGS. 6B and 7B, when the input progress of the first gesture 610, 710 goes from 0% to 50%, the processor 170 may display the first UI element 622, 722 by changing it to indicate that the input degree of the first gesture is 50%.

When the second gesture is not recognized before the input of the first gesture is completed (S540-N), in other words, when the input of the first gesture is completed, the processor 170 may match the first gesture with information regarding a setting state and store it as the first custom gesture (S550).

Referring to FIGS. 6C and 7C, when the input progress of the first gesture 510 becomes 100%, the processor 170 may change and display the first UI element 623, 723 to indicate that the input degree of the first gesture is 100%.

When the input progress of the first gesture becomes 100%, the shape of the first UI element can be completed. When the input progress of the first gesture becomes 100%, the first gesture can be input. When the first gesture is input, the first gesture may be matched with information regarding a setting state and stored as the first custom gesture.

When the gesture is changed to the second gesture 611, 711 before the input progress of the first gesture 610 becomes 100% (S540-Y), the processor 170 may change the first UI element to the second UI element and display it (S560). When the difference between the landmark recognized in previous frame and the landmark recognized in the current frame exceeds the threshold, it may be determined that the first gesture 610 has been changed to the second gesture 611.

Referring to FIGS. 6D and 7D, the processor 170 may change the first element 621, 622, 721, 722 to the second UI element 624, 724 including the second image that visually represents the second gesture 611, 711 and display it.

The processor 170 may change the second UI element 624, 724 to clarify the shape of the second UI element 624 as the input progress of the second gesture increases by applying the same input progress increase/decrease algorithm to the second gesture.

In this case, when the input progress of the second gesture becomes 100%, the shape of the UI element including the second image is completed and the second gesture may be input.

In other words, when the input of the second gesture is completed, the processor 170 may match the second gesture with information regarding a setting state and store it as the second custom gesture (S570).

As such, by visually providing recognition of the gesture input process, a natural interactive process between the user and the electronic apparatus 100 can be induced. In addition, the user can minimize the difference between the gesture recognized by the processor 170 and the gesture intended by the user when using a custom gesture.

Figure 8:
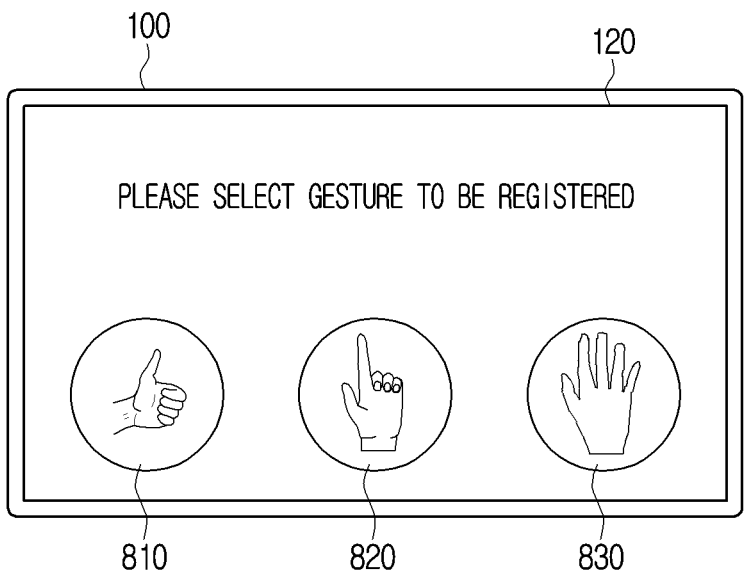
FIG. 8 is a view provided to explain a method of inputting a gesture according to one or more embodiments.

FIG. 8 is a view provided to explain a method of inputting a gesture according to one or more embodiments.

Referring to FIG. 8, the processor 170 may control the display 120 of the electronic apparatus 100 to provide a UI for selecting one of predetermined gestures. Specifically, when a gesture selection input is sensed while the provided UI is displayed, the processor 170 may sense that the selected gesture has been input. In this case, the gesture selection input may mean a hand movement indicating a gesture for selecting a gesture from among the predetermined gestures 810, 820, 830, but this is only an example. The gesture selection input may be sensed using various methods such as through an external device connected to the electronic apparatus 100.

When one of the predetermined gestures is selected, the processor 170 may match the selected gesture with setting state information and store it as a custom gesture.

Figure 9:
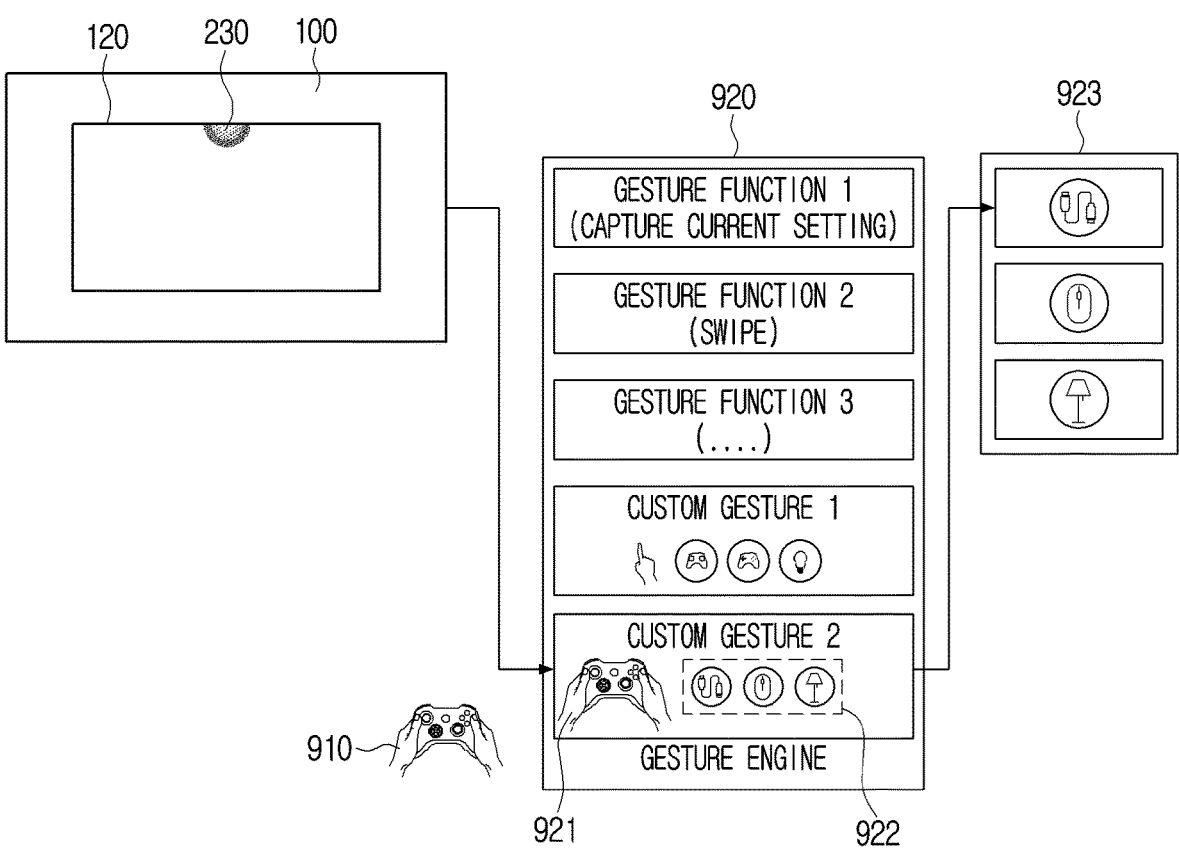
FIG. 9 is a view provided to explain a method of changing setting states of an electronic apparatus 100 and an external device connected to the electronic apparatus using a custom gesture according to one or more embodiments.

FIG. 9 is a view provided to explain a method of changing setting states of the electronic apparatus 100 and an external device connected to the electronic apparatus using a custom gesture according to one or more embodiments.

Referring to FIG. 9, the electronic apparatus 100 may be in a state in which the first UI 230 is displayed. While the first UI 230 is displayed, the processor 170 may recognize the user's gesture 910. Information regarding a predetermined gesture and a custom gesture may be stored in the memory. The custom gesture information may be information in which the custom gesture is stored by being matched with information regarding the setting state of the electronic apparatus 100 and an external device connected to the electronic apparatus 100. When the user's gesture 910 matches the custom gesture2 (921) among the custom gesture information 920 stored in the memory, the setting state of the electronic apparatus 100 and the external device connected to the electronic apparatus 100 may be changed to the stored setting 923 based on the stored information regarding the stored setting state matched with the custom gesture 2 (921). In this case, the custom gesture 2 (921) may be a gesture of holding a game controller with both hands and pressing the right button of the device with the right hand. Here, the stored information regarding the setting state 922 may indicate that the source information of the electronic apparatus 100 is HDMI 1, the external device connection information of the electronic apparatus 100 is a mouse, and the power of the external lighting that is the external device connected to the electronic apparatus 100 is turned on. Here, when the custom gesture 921 of holding the game controller with both hands and pressing the right button with the right hand is input, the electronic apparatus 100 may output the screen of the display 120 using information received from the external device through HDMI 1, connect to the mouse that is an external device, and turn on the power of the external lighting that is an external device.

Accordingly, the user may collectively control the setting states of the electronic apparatus 100 and the external device through the pre-stored custom gesture, thereby improving the user convenience.

Figure 10:
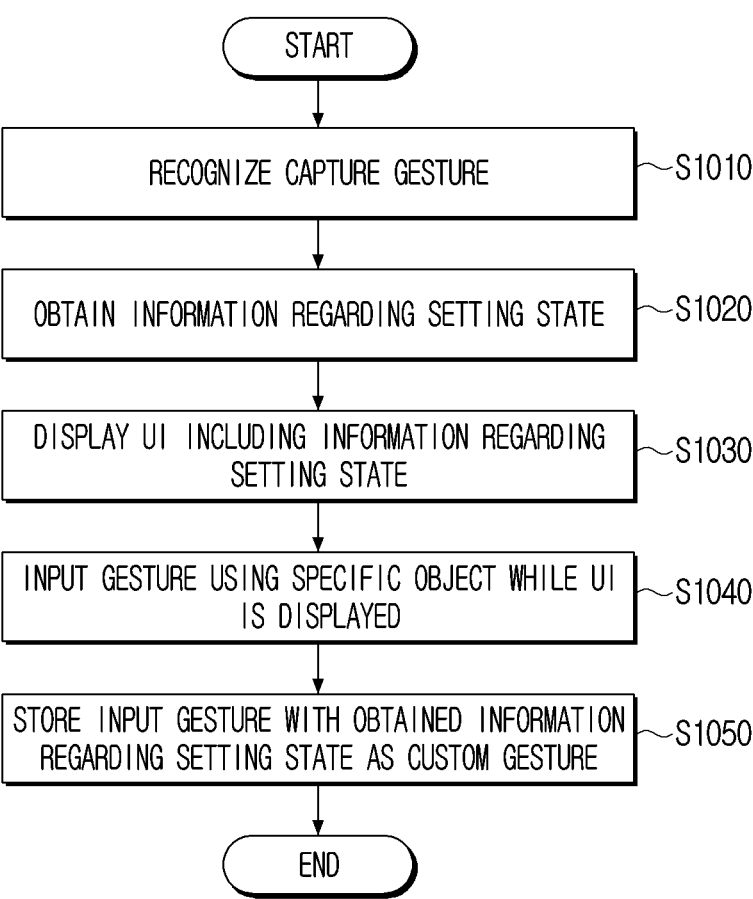
FIG. 10 is a flowchart provided to explain a method of matching information regarding a setting state of at least one

FIG. 10 is a flowchart provided to explain a method of matching information regarding a setting state of at least one of the electronic apparatus 100 or an external device connected to the electronic apparatus 100 with a custom gesture and storing the same according to one or more embodiments.

The electronic apparatus 100 may recognize a capture gesture that is a predetermined gesture that is a predetermined gesture (S1010). The capture gesture that is a predetermined gesture is a gesture preset by the manufacturer of the electronic apparatus 100 and may be, for example, a palm gesture in which the palm is opened and moved more than a threshold distance. However, this is only an example, and the capture gesture that is a predetermined gesture may be a different gesture. In addition, the capture gesture that is a predetermined gesture may be a gesture set by the user separately.

In this case, when the photographed user's gaze is directed toward the electronic apparatus for more than a threshold time and the angle of the user's body is within a predetermined range, the electronic apparatus 100 may display the first UI and recognize a predetermined gesture while the first UI is displayed. However, the electronic apparatus 100 may omit the step of displaying the first UI.

When the capture gesture that is a predetermined gesture is recognized, the electronic apparatus 100 may obtain information regarding the setting state of at least one of the electronic apparatus 100 and an external device connected to the electronic apparatus 100 (S1020). However, this is only an example, and the electronic apparatus 100 may obtain information regarding the setting state in various methods including input through the user interface 150, in addition to the capture gesture that is a predetermined gesture.

The information regarding a setting state may include information regarding a screen source, information regarding customized information and information regarding an external device. However, this is only an example and the information regarding a setting state may include information regarding the setting states of other electronic apparatuses and external devices.

The electronic apparatus 100 may control the display 120 to display the second UI including information regarding a setting state (S1030). In this case, the second UI may include UI elements corresponding to information regarding setting states, respectively, and while the second UI is displayed, the electronic apparatus 100 may sense a user input for selecting at least one of information regarding a plurality of setting states. However, this step can be omitted.

While the second UI is displayed, the first gesture to be saved as a custom gesture may be input (S1040). The custom gesture may mean a gesture for applying information regarding a setting state stored in the memory 160 to the electronic apparatus 100 and an external device connected to the electronic apparatus 100. In this case, the electronic apparatus 100 may display the third UI for storing a custom gesture, and the third UI may include a UI element indicating the input degree of the first gesture while the first gesture is input. However, this step can be omitted.

The electronic apparatus 100 may match the input first gesture with the obtained information regarding the setting state and store it as a custom gesture (S1050). When the custom gesture is recognized (or input), the electronic apparatus 100 may change the setting information of the electronic apparatus 100 and an external device connected to the electronic apparatus 100 based on the information regarding the stored setting state matched with the custom gesture.

Meanwhile, terms "~er/or" or "module" used in the disclosure may include units configured by hardware, software, or firmware, and may be used compatibly with terms such as, for example, logics, logic blocks, components, circuits, or the like. The "unit" or "module" may be an integrally configured component or a minimum unit performing one or more functions or a part thereof. For example, the module may be configured by an application-specific integrated circuit (ASIC).

Various embodiments of the disclosure may be implemented by software including instructions stored in a machine-readable storage medium (for example, a computer-readable storage medium). A machine is a device capable of calling a stored instruction from a storage medium and operating according to the called instruction, and may include the electronic apparatus (for example: electronic apparatus 300) of the disclosed embodiments. In the case in which the above-described command is executed by the processor, the processor may directly perform a function corresponding to the command or other components may perform the function corresponding to the above-described command under a control of the processor. The command may include codes created or executed by a compiler or an interpreter. The machine-readable storage medium may be provided in a form of a non-transitory storage medium. Here, the term "non-transitory" means that the storage medium is tangible without including a signal, and does not distinguish whether data are semi-permanently or temporarily stored in the storage medium.

According to one or more embodiments, the methods according to various embodiments disclosed in the present document may be included and provided in a computer program product. The computer program product may be traded as a product between a seller and a purchaser. The computer program product may be distributed in a form of a storage medium (for example, a compact disc read only memory (CD-ROM)) that may be read by the machine or online through an application store (for example, Play-Store™). In case of the online distribution, at least a portion of the computer program product may be at least temporarily stored in a storage medium such as a memory of a server of a manufacturer, a server of an application store, or a relay server or be temporarily generated.

Each of components (for example, modules or programs) according to various embodiments described above may include a single entity or a plurality of entities, and some of the corresponding sub-components described above may be omitted or other sub-components may be further included in the diverse embodiments. Alternatively or additionally, some components (e.g., modules or programs) may be integrated into one entity and perform the same or similar functions performed by each corresponding component prior to integration. Operations performed by the modules, the programs, or the other components according to the diverse embodiments may be executed in a sequential manner, a parallel manner, an iterative manner, or a heuristic manner, at least some of the operations may be performed in a different order or be omitted, or other operations may be added.

What is claimed is:

1. An electronic apparatus comprising:
a camera;
a display;
a communication interface configured to perform communication with an external device;
a memory configured to store at least one instruction; and
a processor, wherein the processor, by executing the at least one instruction, is configured to:
control the camera to obtain a user's body and gaze,
based on a direction of the gaze corresponding to the electronic apparatus for more than a threshold time and an angle of an arm of the user's body being within a predetermined range, control the display to display a first UI indicating that the electronic apparatus is identifying a gesture,
based on a gesture of the user obtained through the camera while the first UI is displayed being an obtain gesture that is a predetermined gesture, obtain information regarding a setting state of at least one of the electronic apparatus or the external device,
control the display to display a second UI including the information regarding the setting state,
based on a first gesture of the user using a specific object being input while the second UI is displayed, match the first gesture with the obtained information regarding the setting state and store the first gesture matched with the obtained information regarding the setting state as a custom gesture, and
change the threshold time or the predetermined range based on whether the obtain gesture or the custom gesture is identified while the first UI is displayed.

2. The electronic apparatus as claimed in claim 1, wherein the processor, by executing the at least one instruction, is configured to, based on a user's gesture obtained through the camera being the custom gesture, change setting states of the electronic apparatus and the external device based on the obtained information regarding the setting state with which the first gesture was matched.

3. The electronic apparatus as claimed in claim 1, wherein the processor, by executing the at least one instruction, is configured to:
control the display to display a third UI for storing the custom gesture,
based on the first gesture to be stored as the custom gesture being recognized while the third UI is displayed, control the display to display a first UI element for indicating an input degree of the first gesture until the first gesture is input, the first UI element including a first image that visually represents the first gesture,
change the first UI element so that a shape of the first UI element is clarified according to an input degree of the first gesture while the first gesture is input, and
based on the first gesture being changed to a second gesture while the first UI element is being changed, change the first UI element to a second UI element, the second UI element including a second image that visually represents the second gesture.

4. The electronic apparatus as claimed in claim 1, wherein the second UI includes a plurality of UI elements corresponding to each of the information regarding the setting state; and
the processor, by executing the at least one instruction, is configured to, based on an input for selecting at least one of the plurality of UI elements being sensed, match the first gesture with the information regarding the setting state corresponding to the selected UI element based on the input and store the first gesture matched with the information regarding the setting state corresponding to the selected UI element in the memory.

5. The electronic apparatus as claimed in claim 4, wherein the processor, by executing the at least one instruction, is configured to change a range of a UI element selected based on a direction in which the user's hands are pointing or a distance between the user's hands while the second UI.

6. The electronic apparatus as claimed in claim 2, wherein the specific object includes at least one of a game controller, a mouse, a remote controller, or a mobile phone, and
the processor, by executing the at least one instruction, is configured to change a setting state of the electronic apparatus and the external device based on information regarding a setting state corresponding to the specific object among the stored information regarding the setting state.

7. A controlling method of an electronic apparatus comprising:
control a camera of the electronic apparatus to obtain a user's body and gaze,
based on a direction of the gaze corresponding to the electronic apparatus for more than a threshold time and an angle of an arm of the user's body being within a predetermined range, control a display of the electronic apparatus to display a first UI indicating that the electronic apparatus is identifying a gesture,
based on a gesture of the user obtained through the camera while the first UI is displayed being an obtain gesture that is a predetermined gesture, obtaining information regarding a setting state of at least one of the electronic apparatus or an external device that communicates with the electronic apparatus;
controlling the display-of the electronic apparatus to display a second UI including the information regarding the setting state; and
based on a first gesture of the user using a specific object being input while the second UI is displayed, matching the first gesture with the obtained information regarding the setting state and storing the first gesture matched with the obtained information regarding the setting state as a custom gesture; and
changing the threshold time or the predetermined range based on whether the obtain gesture or the custom gesture is identified while the first UI is displayed.

8. The controlling method as claimed in claim 7, further comprising:
based on a user's gesture obtained through the camera being the custom gesture, changing setting states of the electronic apparatus and the external device based on the obtained information regarding the setting state with which the first gesture was matched.

9. The controlling method as claimed in claim 7, further comprising:

displaying, on the display, a third UI for storing the custom gesture;

based on the first gesture to be stored as the custom gesture being recognized while the third UI is displayed, displaying a first UI element for indicating an input degree of the first gesture until the first gesture is input, the first UI element including a first image that visually represents the first gesture;

changing the first UI element so that a shape of the first UI element is clarified according to an input degree of the first gesture while the first gesture is input; and based on the first gesture being changed to a second gesture while the first UI element is being changed, changing the first UI element to a second UI element, the second UI element including a second image that visually represents the second gesture.

10. The controlling method as claimed in claim 7, wherein the second UI includes a plurality of UI elements corresponding to each of the information regarding the setting state, and the method further comprises, based on an input for selecting at least one of the plurality of UI elements being sensed, matching the first gesture with the information regarding the setting state corresponding to the selected UI element based on the input and storing the first gesture matched with the information regarding the setting state corresponding to the selected UI element.

11. The controlling method as claimed in claim 10, further comprising:

changing a range of a UI element selected based on a direction in which the user's hands are pointing or a distance between the user's hands while the second UI.

\* \* \* \* \*